United States Patent [19]

Kushino et al.

[11] Patent Number: 5,142,137
[45] Date of Patent: Aug. 25, 1992

[54] IMAGE SENSOR HAVING CLAMP CONNECTING SENSING AND DRIVING COMPONENTS

[75] Inventors: Masahiko Kushino, Sakai; Hidetoshi Maeda, Kashiwara; Noboru Nakajima, Nara; Mitsuhiko Yoshikawa, Ikoma; Toshiyuki Sakata, Osaka, all of Japan

[73] Assignee: Sharp Kabushiki Kaisha, Japan

[21] Appl. No.: 699,656

[22] Filed: May 14, 1991

[30] Foreign Application Priority Data

May 18, 1990 [JP] Japan ............... 2-52489[U]
Oct. 26, 1990 [JP] Japan ............... 2-112949[U]
Oct. 30, 1990 [JP] Japan ............... 2-114161[U]

[51] Int. Cl.$^5$ ............................ H01J 40/14
[52] U.S. Cl. .................. 250/208.1; 357/30
[58] Field of Search ........... 250/208.1, 211 R; 358/213.11, 213.22; 357/30 D, 30 Q, 30 H

[56] References Cited

U.S. PATENT DOCUMENTS 4,675,534  6/1987  Sekimura et al. ............... 250/208.1
4,999,484  3/1991  Kaneko ........................... 250/208.1

FOREIGN PATENT DOCUMENTS 1-125168  4/1989  Japan.
1-288056  7/1989  Japan.

Primary Examiner—David C. Nelms
Assistant Examiner—K. Shami
Attorney, Agent, or Firm—Nixon & Vanderhye

[57] ABSTRACT

An image sensor includes a light receiving insulating substrate which has a plurality of light receiving elements with one row disposed on one major surface and has a first wiring portion on one side of the major surface for connecting the light receiving elements to a plurality of external driving elements; a driving insulating substrate which has the driving elements mounted on one major surface and has a second wiring portion on one side of the major surface for connecting the driving elements to the light receiving elements; a press-contact connector for electrically connecting the wiring portions, keeping the light receiving insulating substrate and the driving insulating substrate in contact with each other with their respective wiring portions positioned back to back; and engaging means provided close to at least one of the wiring portions in the light receiving insulating substrate and the driving insulating substrate and also provided in the press-contact connector, for enhancing a mechanical holding strength of the press-contact connector to the insulating substrates.

7 Claims, 12 Drawing Sheets

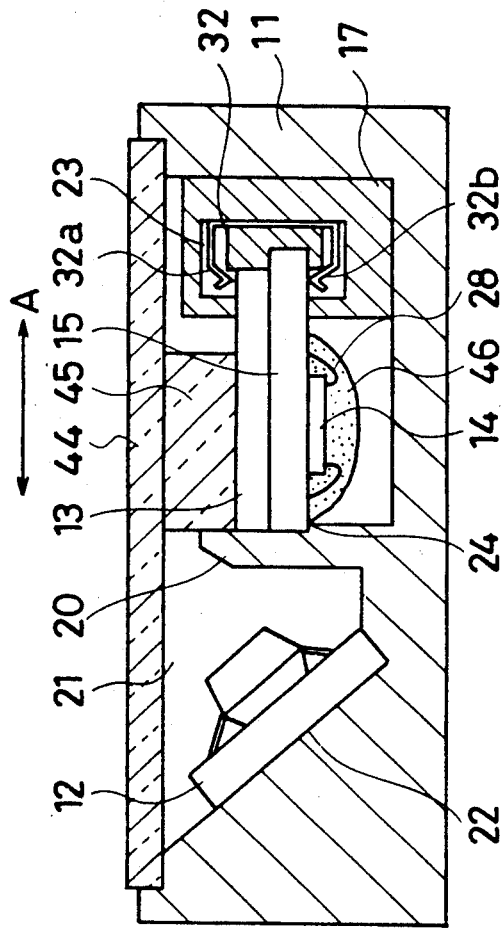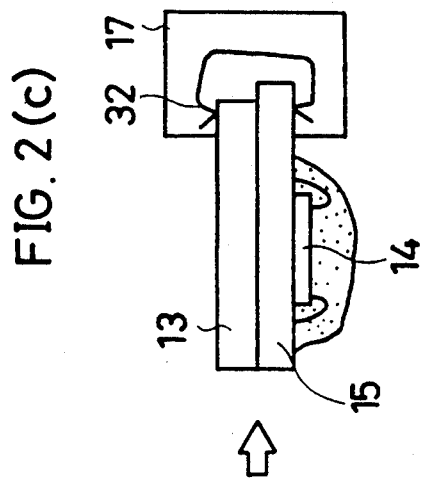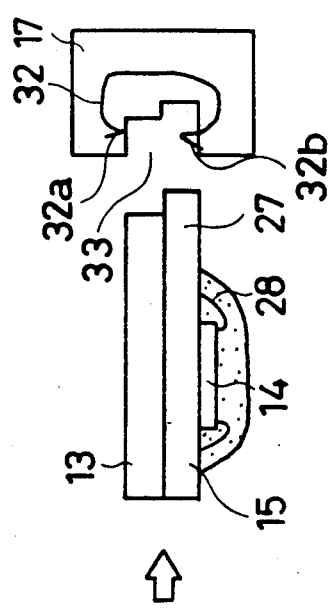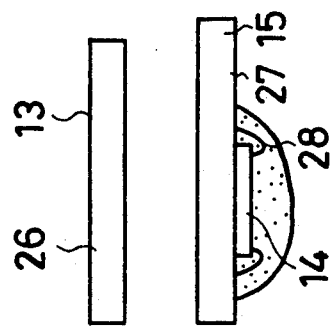

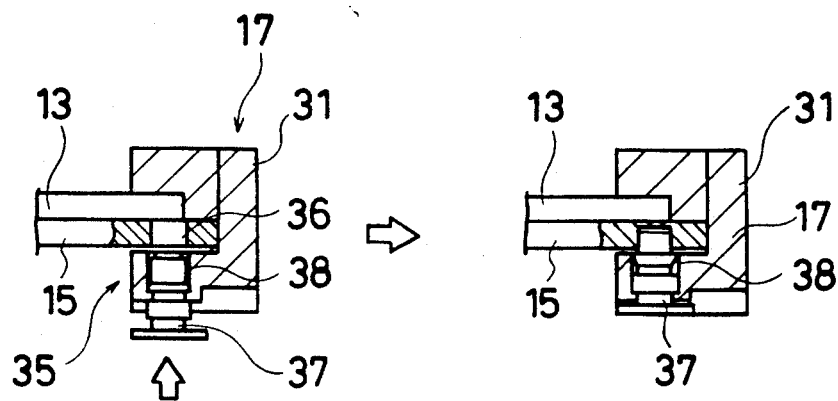
FIG. 8a   FIG. 8b
FIG. 9
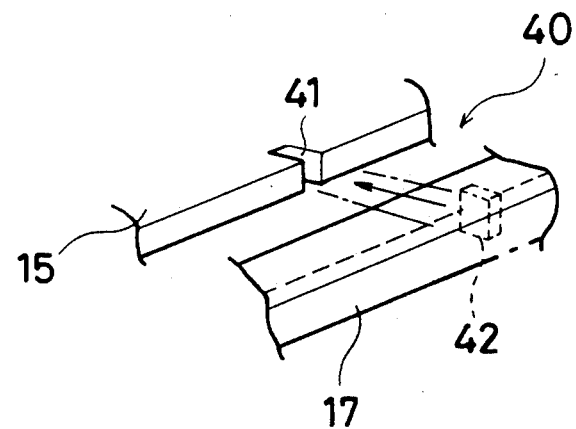

IMAGE SENSOR HAVING CLAMP CONNECTING SENSING AND DRIVING COMPONENTS

BACKGROUND OF THE INVENTION

1. Field of the Invention

The present invention relates to an image sensor. An image sensor according to the present invention is employed in an image scanner which is connected to a word processor, a personal computer or the like.

2. Description of the Prior Art

FIG. 19 is a sectional view showing a configuration of a conventional contact type image sensor.

The contact type image sensor is provided with an open-top unit housing 1 which has a light emitting diode array 2 serving as a light source arranged in a direction orthogonal to paper feeding directions A (i.e., a direction orthogonal to a face of drawing) on one side of the unit housing 1 and a photodiode array substrate 3 and a substrate 5 mounting a driving IC 4 which are stuck horizontally on a single supporting type insulating substrate 6. Both the substrates 3 and 5 are connected to each other to transmit a photodiode array driving signal from a chip of the driving IC 4 through a bonding wire 7, and the connection and the IC chip 4 are covered with protecting resin 8 or the like.

The top of the unit housing 1 and the upper surface of the photodiode array substrate 3 are covered with fiber plates 9 and 10 for transmitting and guiding light.

Japanese Unexamined Patent Publication Nos. 288056/1989 and 125168/1989 disclose image sensors in which a photodiode array substrate and a driving circuit substrate for the same are electrically connected by an elastic connector.

In the above-mentioned prior arts, the photodiode array substrate 3 and the driving IC mounting substrate 5 are fixed to the single insulating substrate 6.

For the reason, when defects of elements in the photodiode array are found or unsatisfactory conditions are caused in the wire bonding 7 and IC 4 after the unit is assembled, only defective parts of the photodiode array substrate 3, IC 4, IC mounting substrate 5 and supporting substrate 6 cannot be replaced with new ones.

Allowing for wire bonding, it is desirable that bonding pads of the photodiode array and IC bonding pads are arranged in horizontal direction to keep the resultant difference in level approximately an amount corresponding to the thickness of the IC 4.

However, when the photodiode array substrate 3 and the IC mounting substrate 5 are horizontally arranged, the contact type image sensor unit 1 has the problem that the unit width is larger in the paper feeding direction A in external dimensions because the photodiode array substrate 3 and the IC mounting substrate 5 are disposed along the paper feeding direction A.

SUMMARY OF THE INVENTION

An object of the present invention is to provide an image sensor in which connection between a photodiode array substrate and an IC mounting substrate is not conventional wire bonding, so that, after a unit is once assembled, unsatisfactory parts alone are replaced and the unit is assembled again.

The present invention is an image sensor comprising a light receiving insulating substrate which has a plurality of light receiving elements with one row disposed on one major surface and has a first wiring portion on one side of the major surface for connecting the light receiving elements to a plurality of external driving elements; a driving insulating substrate which has the driving elements mounted on one major surface and has a second wiring portion on one side of the major surface for connecting the driving elements to the light receiving elements; a press-contact connector for electrically connecting the wiring portions, keeping the light receiving insulating substrate and the driving insulating substrate in contact with each other with their respective wiring portions positioned back to back; and engaging means provided close to at least one of the wiring portions in the light receiving insulating substrate and the driving insulating substrate and also provided in the press-contact connector, for enhancing a mechanical holding strength of the press-contact connector to the insulating substrates.

Also, the present invention is an image sensor comprising a light receiving insulating substrate which has a plurality of light receiving elements disposed on one major surface and has a first wiring portion on one side of the major surface for connecting the light receiving elements to a plurality of external driving elements; a driving insulating substrate which has the driving elements mounted on one major surface and has a second wiring portion on one side of the other major surface for connecting the driving elements to the light receiving elements; an L-shaped elastic connector for electrically connecting the first and second wiring portions under the circumstance that the light receiving insulating substrate and the driving insulating substrate are overlaid with each other with the first and second wiring portions positioned close to each other in the identical direction; and pressing means for pressing the L-shaped elastic connector to the light receiving insulating substrate and the driving insulating substrate.

BRIEF DESCRIPTION OF THE DRAWINGS

FIG. 1 is a sectional view showing a configuration of a contact type image sensor of an embodiment according to the present invention; FIGS. 2(a), 2(b), and 2(c) are diagrams showing a procedure of attaching a press-contact connector;

FIGS. 8a and 8b are a sectional view showing an engaging means in attaching the press-contact connector to the insulating substrate;

FIG. 9 is a perspective view showing a guide means;

FIG. 12(a) is an elevational view of an elastic connector, while

DETAILED DESCRIPTION OF THE PREFERRED EMBODIMENTS

Figure 3:
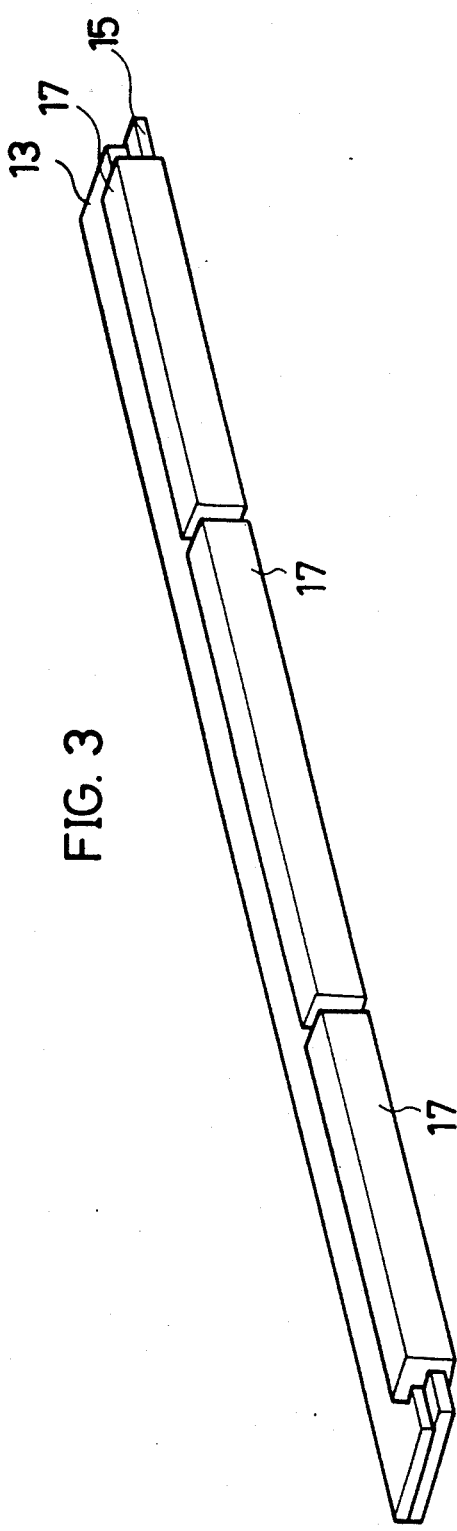
FIG. 3 is a perspective view showing a state of an insulating substrate to which the press-contact connector is attached.

Now, preferred embodiments will be described in conjunction with FIGS. 1 through 18.

As shown in FIG. 1, a contact type image sensor according to the present invention comprises an open-top box-shaped unit housing 11 in which a light emitting diode array 12 serving as a light source is aligned in a direction orthogonal to a paper feeding direction A on one side of the unit housing 11 and a light receiving insulating substrate 13 with light receiving elements disposed on one major surface thereof and a driving insulating substrate 15 mounting a driving element 14 on one major surface are placed on the other side. Both the insulating substrates 13 and 15 have their respective insulating major surfaces in contact with each other, and wiring portions 16 of the light receiving insulating substrate 13 and driving insulating substrate 15 are electrically connected by a press-contact connector 17.

The unit housing 11 is, as shown in FIG. 1, provided with a partition 20 in the center portion of the inside, and the light emitting diode array 12 is attached to an inclined wall 22 in a light emitting diode array housing 21 defined by the partition 20.

A light receiving cell 23 also defined by the partition 20 on the opposite side is provided with a shoulder 24 on which the driving insulating substrate 15 are mounted to fit on it. The shoulder 24 and the press-contact connector 17 hold the light receiving insulating substrate 13 and the driving insulating substrate 15.

The light receiving insulating substrate 13 is, as shown in FIG. 2, provided with a wiring pattern on one major surface 26, and a plurality of photodiodes serving as light receiving elements are aligned in the wiring pattern. The other major surface of the light receiving insulating substrate 13 functions as an electrical insulating material to break an electrical conduction to the driving insulating substrate 15.

The driving insulating substrate 15 has, as shown in FIGS. 1 and 2, a wiring pattern formed and a plurality of driving ICs denoted by driving element 14 mounted on one major surface 27, and bonding wire 28 connects between the driving element 14 and the wiring pattern. The other major surface of the driving insulating substrate 15 has an insulating property to break an electrical conduction to the light receiving insulating substrate 13.

Figure 7:
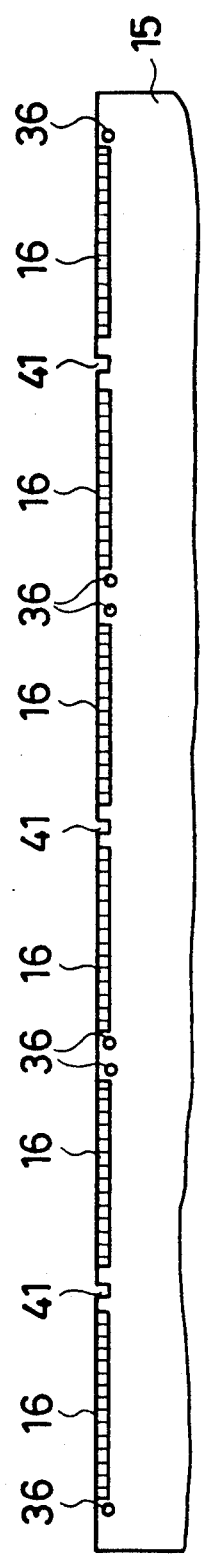
FIG. 7 is a plan view showing a driving type insulating substrate.

The press-contact connector 17 is attached to the end of the insulating substrates 13, 15 mated with each other. As shown in FIG. 7 at the end of the surfaces of the insulating substrates 13, 15 where the wiring patterns are formed, 180 connecting pads 16 (gold plated terminals for press contact) serving as wiring portions are formed each of which is divided into tree pieces.

The press contact connector 17, as shown in FIGS. 1 and 8, has a connector body 31 in which elastic C-shaped contact pins 32 fit, and opposite ends 32a, 32b of the pin 32 project from a concave wall 33 (see FIG. 2) for engaging with the substrates in the connector body 31 without any obstruction.

Figure 4:
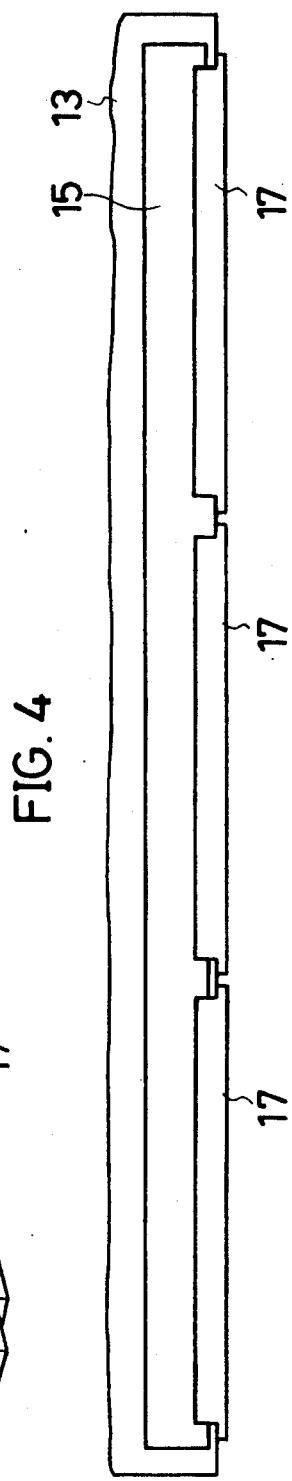
FIG. 4 is a plan view of the state shown at FIG. 3.
Figure 5:
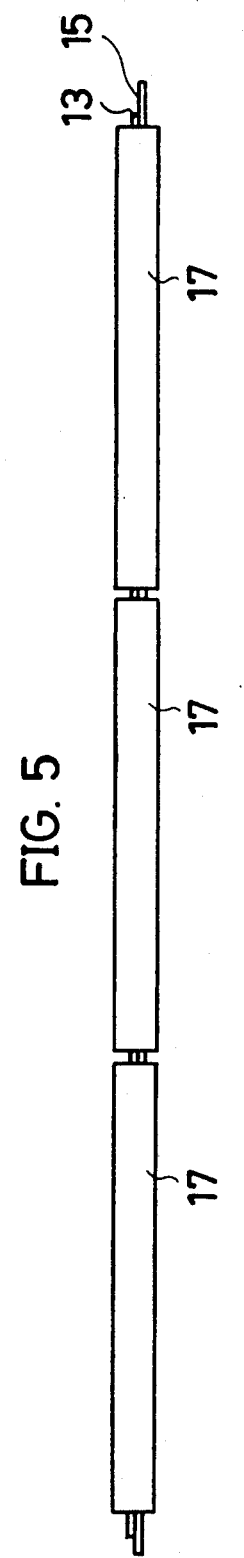
FIG. 5 is an elevational view of the state shown at FIG. 3.
Figure 6:
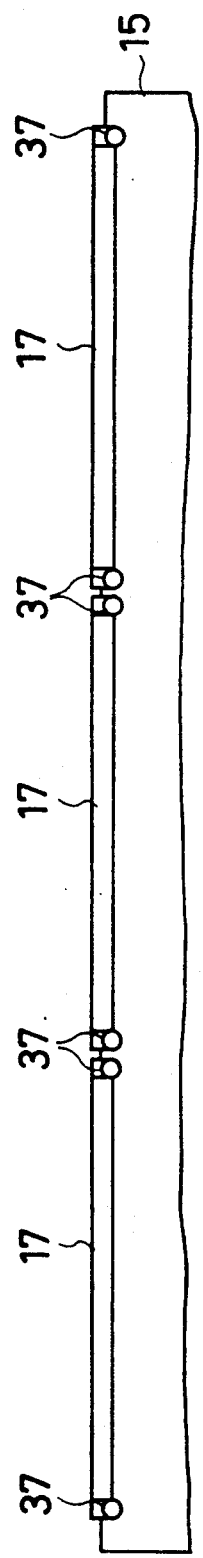
FIG. 6 is a bottom view of the state shown at FIG. 3.

In this embodiment, there are 60 of the contact pins 32 fitting in the press-contact connector 17 disposed corresponding to the connecting pads 16 in the longitudinal direction of the connector body 31. Thus, three of the press-contact connectors 17 for connecting the light receiving insulating substrate 13 and the driving insulating substrate 15 are required, as shown in FIG. 4–6. The reason for this is as follows: There are 180 of the connecting pads 16 for each of the insulating substrates 13 and 15; when the single press-contact connector 17 fits on the insulating substrates 13, 15 mated with each other, a large strength is required to insert the substrates into the press-contact connector 17. Then, in order to reduce the inserting strength, the press-contact connector 17 is divided into three pieces so that each of the connectors 17 can be in press contact with 60 pads.

Additionally, an engaging means 35 is provided to enhance mechanical holding force for holding the light receiving insulating substrate 13 and the driving insulating substrate 15. The engaging means 35 is composed of two or more apertures 36 formed in the insulating substrate 15 and engaging pins 37 formed in the press-contact connector 17 for engaging with the apertures 36.

The engaging pins 37 slidably fit in vertical openings 38 formed at opposite ends of the press-contact connector 17, as shown in FIG. 8. Thus, in the embodiment, the apertures 36 mated with the engaging pins 37 are formed at six positions in the driving insulating substrate 15 as shown in FIG. 7, because there are three press-contact connectors 17 in all.

Moreover, a guide means 40 is provided for guiding the press/contact connector 17 when attached to the light receiving insulating substrate 13 and the driving insulating substrate 15. The guide means 40 is composed of a notch 41 formed in the substrate 15 and a guide piece 42 formed in the connector 17 for fit in the notch 41.

The guide piece 42 projects at the center portion of the press-contact connector 17 in its longitudinal direction, as shown in FIG. 7. Hence, the notch 41 in the driving insulating substrate 15 is accordingly formed at three positions in all, as shown in FIG. 7.

In FIG. 1, reference numerals 44, 45 denote fiber plates for transmitting and guiding light, while numeral 46 denotes driving element protecting resin.

When the unit housing 11 is assembled in the above-mentioned configuration, as shown in FIG. 2, first the light receiving insulating substrate 13 and the driving insulating substrate 15 with the driving element 14 have their respective insulating surfaces in contact with each other, and under the circumstances, those substrates are inserted into the concave wall 33 of the press-contact connector 17. In this way, keeping the insulating substrates 13, 15 completely inserted, the contact pins 32 are elastically transformed to come in press contact with the connecting pads 16 serving as wiring portion.

When the press-contact connector 17 fits on those substrates 13, 15, the guide means 40 helps the press-contact connector 17 to move along the notch 41 in the driving insulating substrate 15. Thus, it serves as a guide to insert the substrates into the connector 17; this brings about an improved operation, and an error of insertion may be reduced.

When the insertion into the press-contact connector 17 is completed, the engaging pins 37 of the engaging means 35 are inserted into the apertures 36 in the driving insulating substrate 15 so that the whole of the press-contact connector 17 is fixed. Thus, it can be prevented that the press-contact connector 17 slips out due to vibration or the contacts are out of positions.

When the inserting operation is completed, an electrical connection between the insulating substrates 13, 15 and the contact pins 32 is completed, and both the substrate 13, 18 are pinched and held by the contact pins 32.

After that, the insulating substrates 13, 15 are put in the cell 23 in the unit housing 11 in position while the light emitting diode array 12 is put in the unit housing 21 in position, then the fiber plates 44, 45 are put over to assemble the unit housing 11.

With the above configuration, the contact type image sensor unit has external dimensions of approximately L 240×W 20×H 9 mm, compared with the dimensions of approximately L 240×W 27×H 10 mm in the conventional unit, the width (W) is reduced by 7 mm.

The present invention should not be limited to the precise form in the above mentioned embodiment, but there may be many modifications and variations without departing from the true scope of the present invention.

For example, the press-cotract connector 17 is not limited in shapes of its boby and contcat pints, and their respective material.

Although the connecting pads of the insulating substrates are formed at 180 positions and the press-contact connector 17 is divided into three pieces in this embodiment, the connector 17 may be divided into any number of pieces, taking in adequate inserting strength based upon the number of the pads into consideration.

Furthermore, although the apertures 36 of the engaging means 35 and the notch 41 of the guide means 40 are formed in the driving insulating substrate 15 in this embodiment, they may be formed in the light receiving insulating substrate 13, or they may be formed in both substrates 13, 15.

The image sensor of the present invention can be adapted not only the contact type image sensor but another type image sensor.

As will be recognized in the previous description, according to the present invention, the light receiving insulating substrate and the driving insulating substrate can be held by the press-contact connector; therefore, unlike the conventional embodiment, a substrate for supporting them and a bonding material are not required.

When some unsatisfactory condition is found in either the light receiving insulating substrate or the driving insulating substrate upon a property evaluation after the completion of the unit, one of the insulating substates cannot be replaced if they are connected by a conventional wire bonding. However, if they are connected by the press-contact connectors, merely the defective insulating substrate may be replaced with a good one when one of the insulating substrates is defective, and the unit can be assembled again. Thus, the cost for the useless material can be curtailed at the minimum expense.

As to the conventional wire bonding, it takes more an hour because the process goes from wire connection through resin potting to curing. However, the press-contact connector can be easily attached, and there is an effect that the time required for assembling the unit can be considerably reduced.

Then, another embodiment according to the present invention will be described in conjunction with FIGS. 10 through 15.

As can be seen, a contact type image sensor 20 according to the present invention comprises an open top sheild housing 21 having a U-shape if seen from the side, a driving insulating substrate 23 which is mounted and fixed onto the shield housing 21 and has driving elements 22, detecting elements, etc. mounted on it, a plurality of light-scattering type light emitting elements (light emitting diodes) 24 disposed in a direction orthogonal to a paper feeding direction on one side of the upper major surface of the driving insulating substrate, a light receiving insulating substrate 27 which has light receiving elements 26 disposed and overlaid through a holder 25 over the upper major surface of the driving insulating substrate 23, an L-shape elastic connector 30 for electrically connecting a wiring portion 28 of the light receiving insulating substrate 27 and a wiring portion 29 of the driving insulating substrate 23, a housing 31 serving as pressing means to apply pressure to the elastic connector 30 and fix it to the light receiving insulating substrate 27 and driving insulating substrate 23, and a fiber array plate 33 for guiding the light from the light emitting elements 24 to an original reading unit 32 and guiding the light reflected by the original reading unit 32 to the light receiving elements 26.

Figure 11:
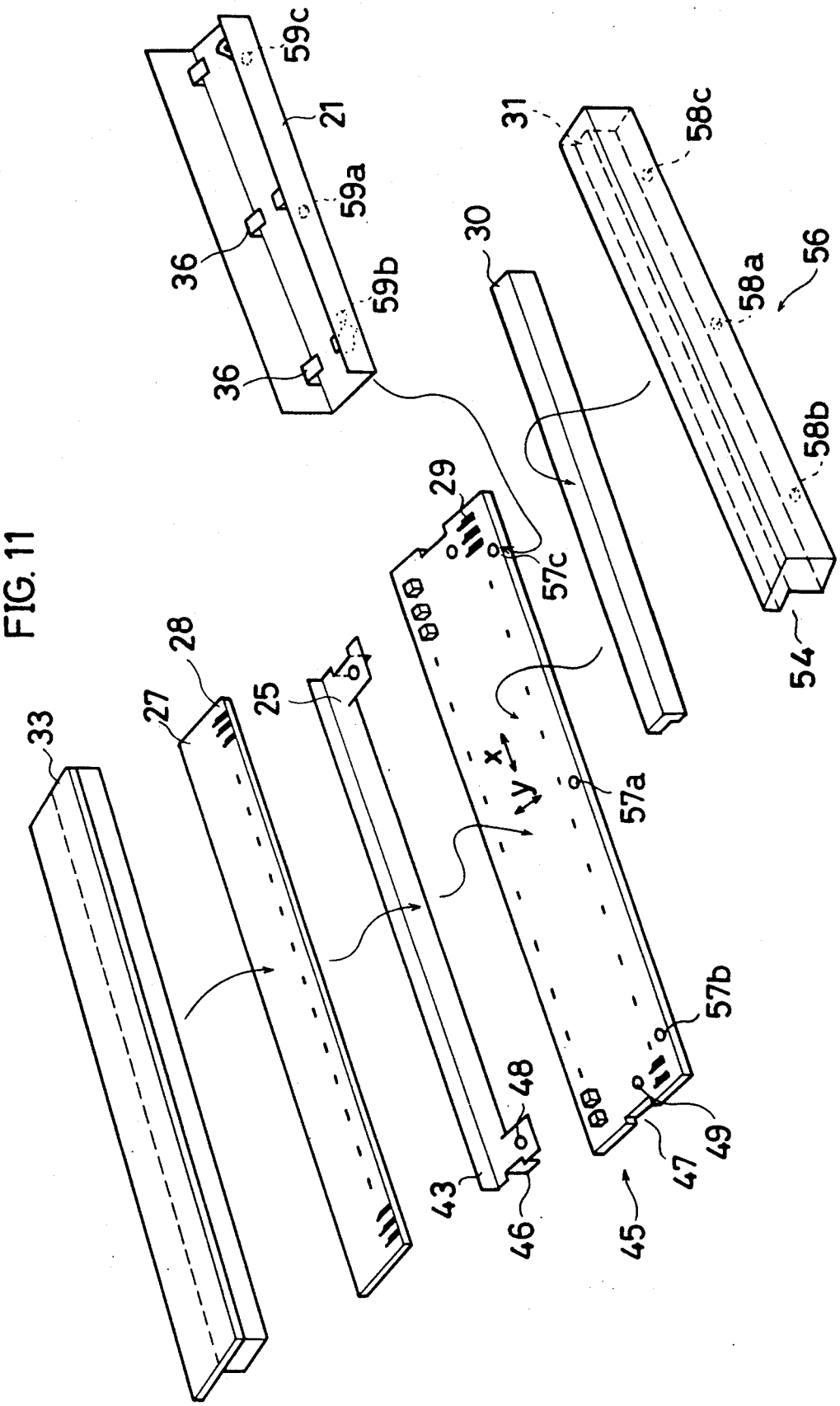
FIG. 11 is an exploded perspective view showing the contact type image sensor.

The sheild housing 21 is made of aluminum, and a flange 35 bending inwardly for supporting the fiber array plate 33 is formed at the upper end of a vertical wall 34 at one side of the housing 21. At the middle of the vertical wall 34, as shown in FIG. 11, substrate supporting pieces 36 are formed by cutting part of the housing wall and bending it up at three portions. On the substrate supporting pieces 36 and the top of a vertical wall 37 at the other side of the housing 21, the driving insulating substrate 23 are mounted.

The upper portion of the wall 34 at the one side of the housing 21 is slanted so that a scattered light emitted by the light emitting elements is directed to or reflected to an original, and a white seal material 39 of which surface is formed with minute convexities and concavities are affixed to a slanted face 38 of the housing 21 and a surface of a light blocking wall 43 of the holder 25 near the light emitting elements. An upper surface of the driving insulating substrate 23 on which the light emitting elements are mounted is coated with white resist 40.

Figure 10:
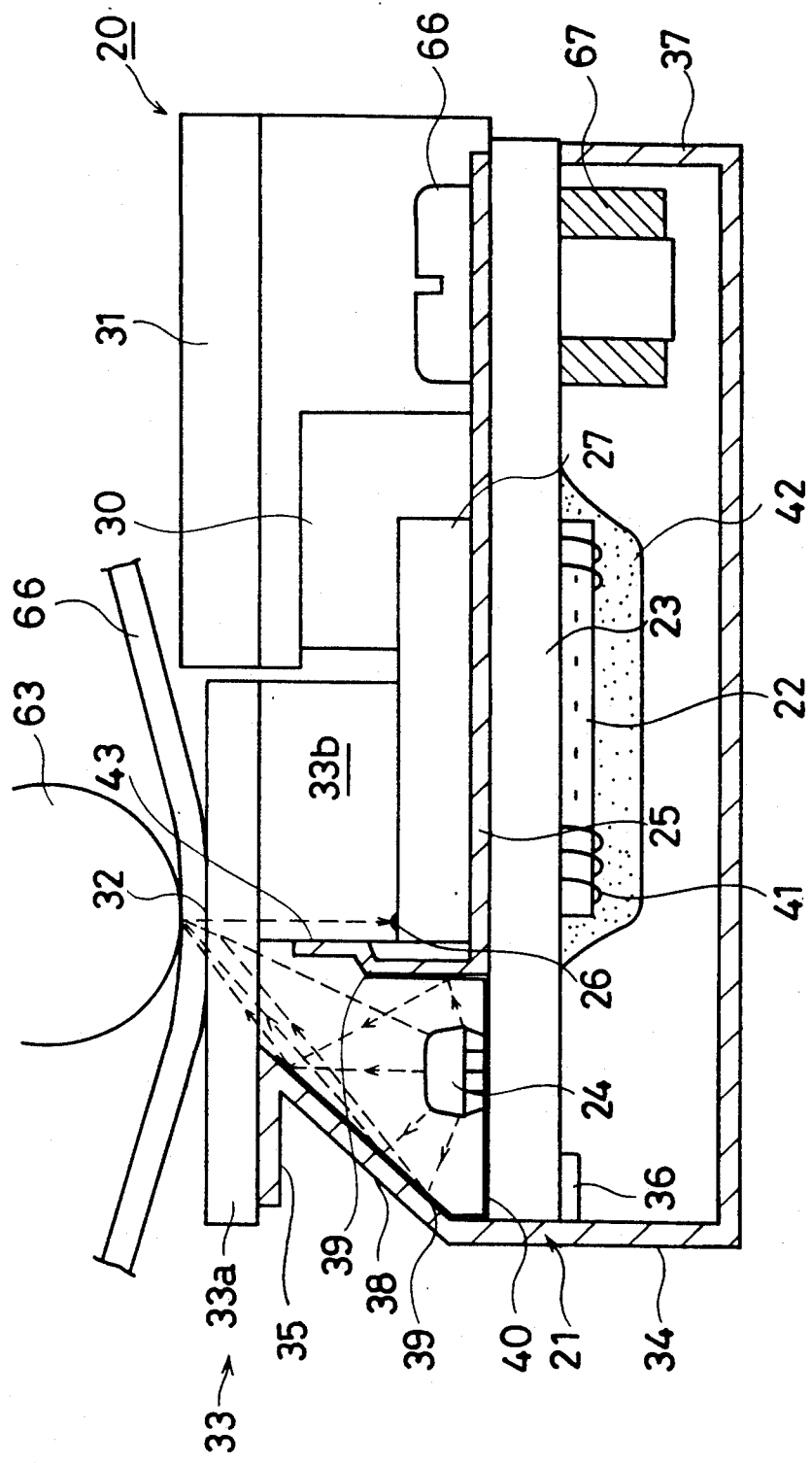
FIG. 10 is a sectional view showing a configuration of a contact type image sensor showing another embodiment according to the present invention.

The driving insulating substrate 23 has dual-sided wiring patterns as shown in FIG. 10, and at the bottom of it IC chips 22 functions as driving elements and detecting elements are mounted. The IC chips 22 are connected through bonding wires 41 to the wiring pattern, and they are all covered with protecting resin 42.

On the other hand, as shown in FIG. 11, the driving insulating substrate 23 has the light emitting diodes 24 serving as the light emitting elements mounted on one side of its upper surface and also has approximately 180 wiring portions 29 on the other side. The wiring portions 29 are electrically conducted through through-holes (not shown) to a wiring pattern on the bottom surface of the substrate.

The holder 25 is formed in an L-shape if seen from the side, as shown in FIGS. 10 and 11, and its vertical wall serves as a light blocking wall 43 to block the light directly received from the light emitting diodes 24 by the light receiving elements 26 and also serves as a reference surface to which the light receiving insulating substrate 27 and the fiber array plate 33 are fixed.

Then, there is provided a positioning means 45 for positioning the holder 25 with the light receiving insulating substrate 27 bonded to it in the driving insulating substrate 23. The positioning means 45 is composed of positioning guides 46 bending downward at the opposite ends of the holder 25 and notches 47 formed at the opposite ends of the driving insulating substrate 23 for engaging with the guides 46.

The holder 25 and the driving insulating substrate 23 have apertures 48, 49 formed at their respective opposite ends for fixing them after they are positioned.

The light receiving insulating substrate 27 has 180 wiring portions 28 disposed corresponding to the wiring portions 29 in the driving insulating substrate 23. The light receiving insulating substrate 27 is smaller in width than the driving insulating substrate 23 as shown in FIG. 10; for the reason, the wiring portions 28, 29 of the light receiving insulating substrate 27 and the driving insulating substrate 23 are arranged in tiers with the wiring portions 28, 29 positioned closed to each other in the identical direction.

Figure 12A:
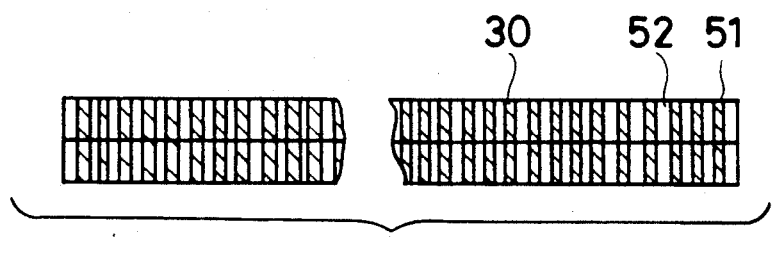
Figure 12B:
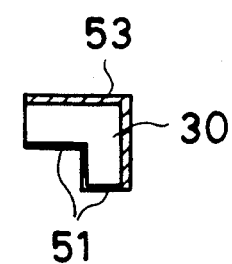
FIG. 12(b) is a side view of the same.

The elastic connector 30, which is formed in an L-shape and has conductive layers 51 of electrically conductive rubber and insulating layer 52 of insulating rubber alternately disposed at the inside and bottom of it as shown in FIGS. 12(a) and 12(b), electrically connects the wiring portions 28, 29 arranged in tiers. Thus, the elastic connector 30 with an insulating material 53 affixed to its outer surface fits in an L-shaped cut in the housing 31.

The housing 31 is formed in an L-shape if seen from the side, and its inner cut 54 serves to press and fix the elastic connector 30.

Figure 13:
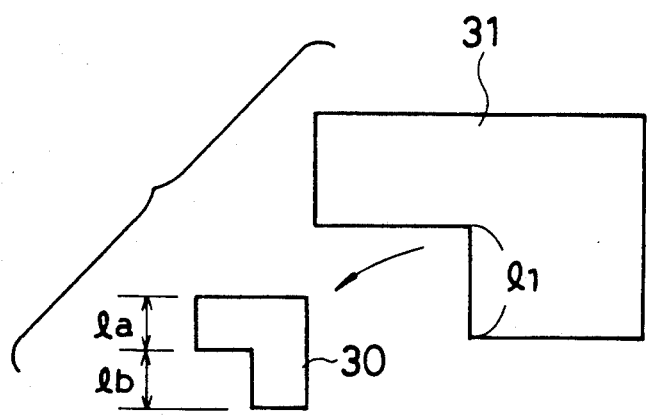
FIG. 13 is a side view showing the relation between the elastic connector and a housing.

A length $l_1$ of the pressing and fixing housing 31 is, as shown in FIG. 13, about 20% shorter than the height $l_a + l_b$ of the elastic connector 30. This is because the optimum contact resistance is obtained when the pressing of the elastic connector 30 is carried out under the dimensional deference of about 20%.

A fixing means 56 of the housing 31 for fixing the elastic connector 30 is composed of three apertures 57a, 57b and 57c formed at opposite ends and center portion at one side of the driving insulating substrate 23 as shown in FIG. 10, three apertures 58a, 58b and 58c formed at the bottom of the housing 31, three apertures 59a, 59b and 59c formed at a bottom wall 21a of the shield housing 21, and screws (not shown) fitting through the apertures 57a–59c for fixing the three members. The aperture 57a at the center of the driving insulating substrate 23 is circular in shape, while the apertures 57b, 57c at the opposite ends of it are elliptical in shape elongated in y-axis direction, as shown in FIG. 11.

Figure 14:
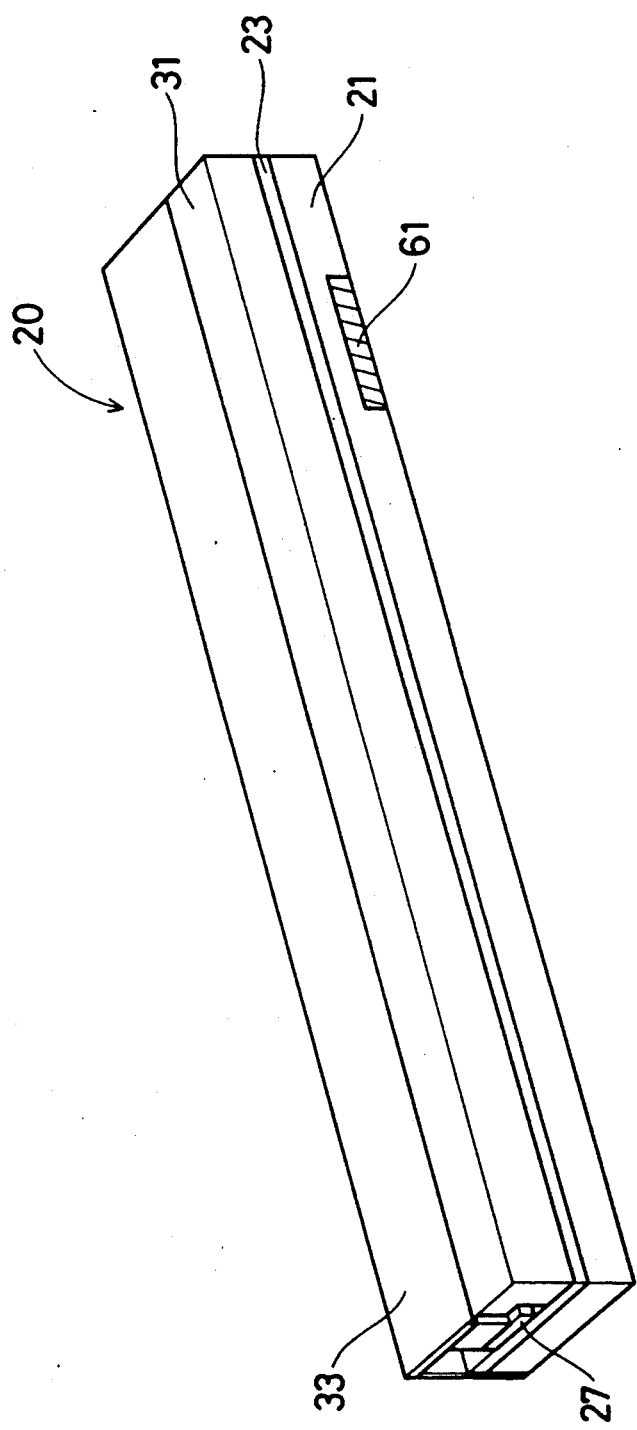
FIG. 14 is a perspective view showing the contact type image sensor assembled.

The fiber array plate 33 is composed of a CLEAR type fiber array 33a having no absorber and an EMA type fiber array 33b attached to the bottom of it and including an absorber, as well known.

in FIG. 14, reference numeral 61 denotes a connector portion of the contact type image sensor 20.

Figure 15:
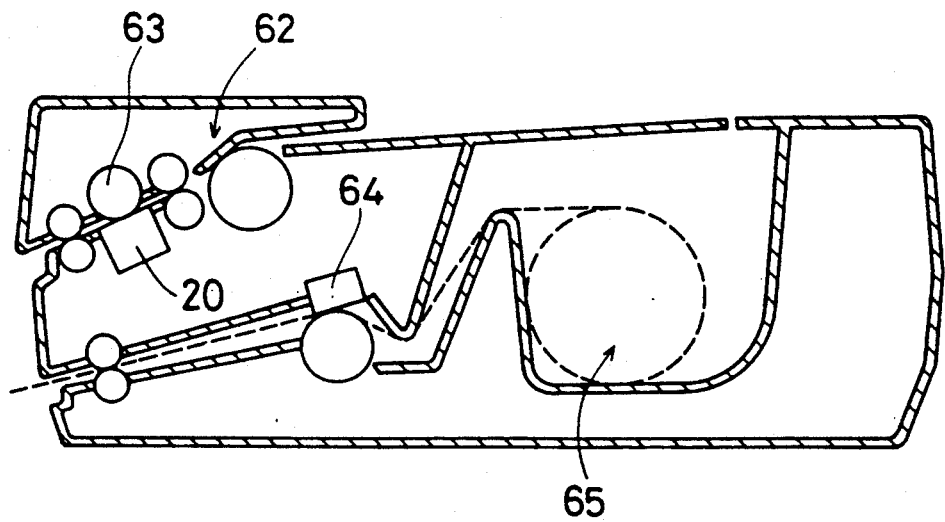
FIG. 15 is a sectional view showing information transfer equipment employing an image sensor according to the present invention.

The contact type image sensor 20 is used, for example, for a reading unit 62 in an information transfer equipment such as a facsimile and the like, as shown in FIG. 15. Referring to FIG. 15, a roller 63 is placed opposed to the contact type image sensor 20 in an original through path, and the roller 63 is under drive control by a pulse motor. An image signal from the image sensor 20 is taken in an image processing circuit in synchronizing with the signal to the pulse motor. Reference numeral 64 denotes a thermal head for thermally transferring transmitted information to thermal paper 65. In FIG. 10, numeral 66 denotes an original.

With the above-mentioned configuration, a procedure of assembling the contact type image sensor 20 will be explained.

As shown in FIG. 11, the fiber array plate 33 is registered to the light receiving insulating substrate 27 and bonded to it by resin or the like. Then, the reference surface of the fiber array plate 33 and the reference surface 43 of the light blocking and fixing holder 25 are registered and bonded.

Positioning of the light receiving elements can be easily effected by fitting the positioning guides 46 of the holder 25 into the notches 47 of the driving insulating substrate 23, and after the positioning is completed, screws 66 fitting through the apertures 48 in the holder 25 and the apertures 49 in the driving insulating substrate 23 and nuts are used to fix the substrate 23 to the holder 25.

Then, the shield housing 21 is attached to the surface where the ICs are mounted in the driving insulating substrate 23. After that, the L-shaped elastic connector 30 formed by a combination of conducting material and insulating material on the wiring portion 28 in the light receiving insulating substrate 27 and the wiring portion 29 in the driving insulating substrate 23 is temporarily placed. That is covered with the pressing and fixed housing 31.

Then, screws are inserted from the bottom of the shield housing 21 through the aperture 59a of it, the aperture 57a at the center of the driving insulating substrate 23 and the aperture 58a at the center of the housing 31 to temporarily fix those members. The aperture 57a at the center is circular in shape, and at this time, reference points of x- and y-axes of the unit are determined as shown in FIG. 11.

The apertures 56b, 57c at the opposite ends of the driving insulating substrate 23 are elliptical in shape, and even if the light receiving insulating substrate 27 is deviated somewhat on the skew, pressure is applied uniformly to the elastic connector 30. The driving insulating substrate 23 is eventually screwed on again at the three positions, and thus, the pressing and fixing are completed. The elastic connector 30 is fixed by screws inserted upward from the bottom wall 21a of the shield housing 21.

The external dimensions of the contact type image sensor unit assembled in this way are L 240×W 18×H 8.5 mm, compared with the dimension of approximately L 240×W 27×H 10 mm in the conventional unit, the width (W) is reduced by 9 mm while the height (H) is reduced by 1.5 mm. In this way, an efficiency in assembling the unit is considerably enhanced.

The width (W) can be reduced because, unlike the conventional unit, the light receiving insulating substrate 27 is overlaid with the driving insulating substrate 23, while the height (H) can be reduced because a conventional light converging lens using for light emitting elements is not employed, and consequently, a reading unit 32 and the light emitting element can be put closer to each other, and because the shield housing 21 of U-shape is employed and ICs such as driving elements 22 and the like are arranged at the bottom of the driving insulating substrate 23.

Furthermore, as shown in FIG. 10, the housing 21 is processed into a Z-shape with the botton surface of the LED chip, and this allows all the light scattered around the light emitting elements 24 to be gathered to the original reading unit 32 except for the light attenuated and absorbed by the inner wall of the housing; consequently, an illuminance of the surface of an original can be enhanced 5%. In FIG. 10, only the scattered light directed to the original reading unit 32 is shown with a broken line.

Conventionally, an illuminanace between the LED chips is low. In this embodiment, however, since a reflection of the scattered light is utilized, the light in a single line is unified throughout, and a deviation of quantity of the light is reduced about 5%.

Figure 16:
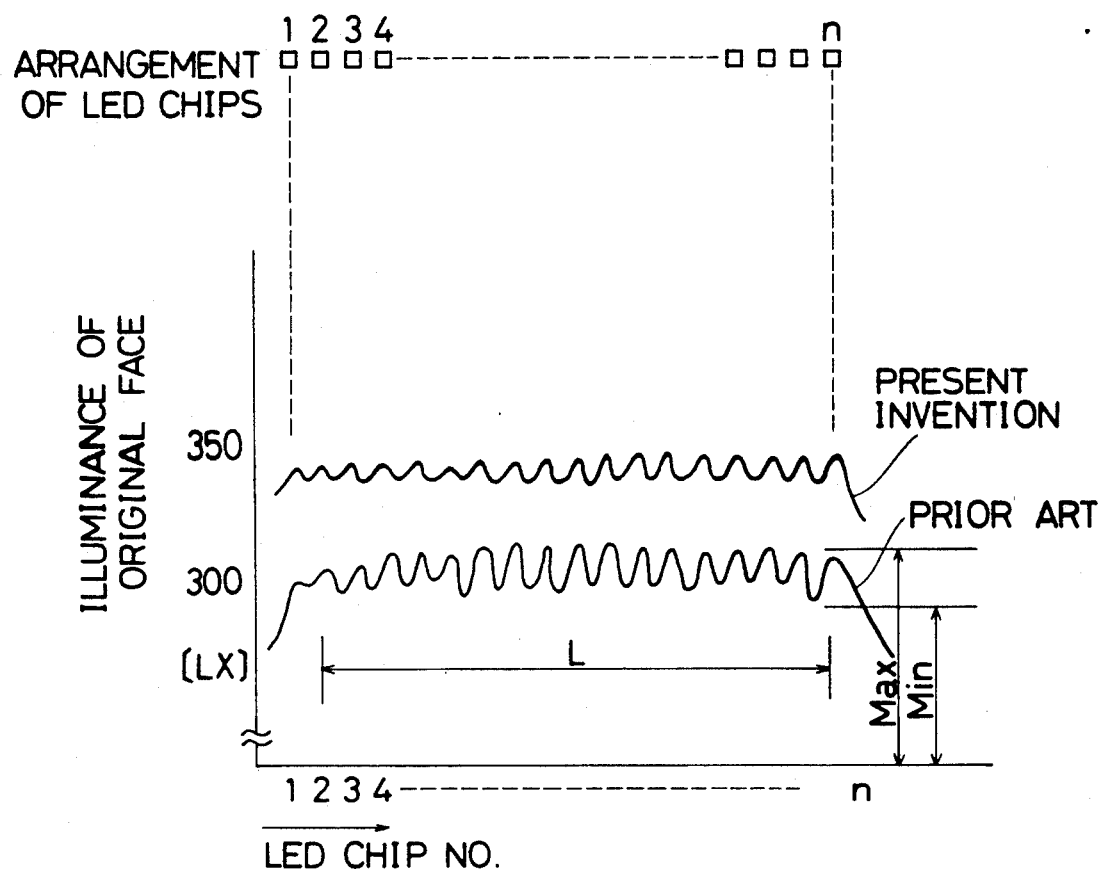
FIG. 16 is a diagram showing the relation between an arrangement of light emitting elements (LED) and an illuminance of the face of an original.
Figure 17:
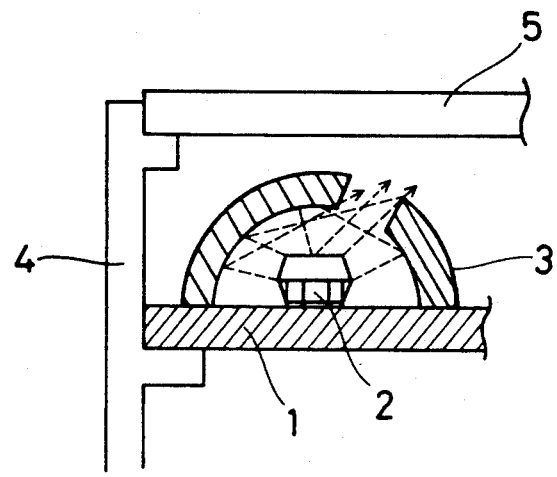
FIG. 17 is a diagram showing a variation related to the present invention.
Figure 18:
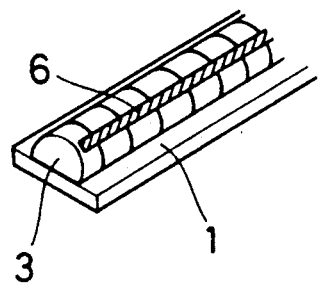
FIG. 18 is a perspective view showing a light guide of FIG. 17.
Figure 19:
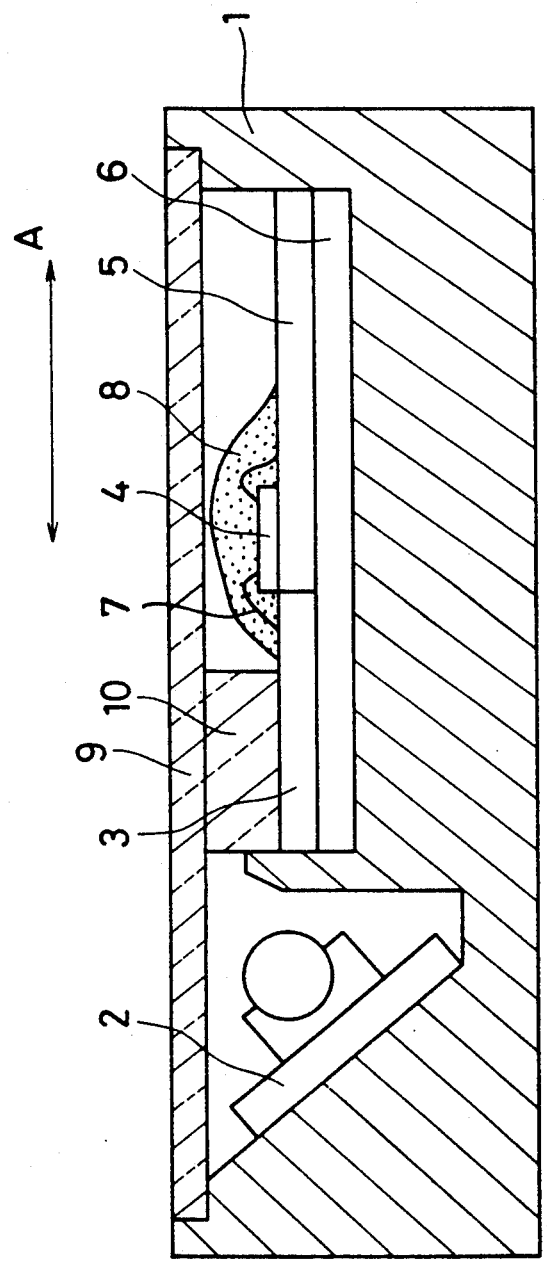
FIG. 19 is a sectional view showing a configuration of a conventional contact type image sensor.

The deviation of quantity of light herein is expressed in FIG. 16 by the following formula, assuming the maximum value of the illuminance of the face of an original is Max and the minimum value is Min:

$$\text{Deviation of Quantity of Light } (\Delta EH) = \frac{\text{Max} - \text{Min}}{\text{Max} + \text{Min}} \times 100$$

In FIG. 16, reference character L denotes an effective length of illumination.

Compared with the above, affixing the white seal material 39 to the inner wall of the housing as shown in FIG. 10 causes the illuminance of the face of the original to be further enhanced, and eventually, a deviation of the quantity of light is reduced 5%.

The present invention should not be limited to the precise form in the above mentioned embodiment, but there may be many modifications and variations without departing from the true scope of the present invention.

Fog example, instead of the scattered light type light emitting element, an ordinary light emitting element as used in the first embodiment may be employed.

In the above embodiments, a contact type image sensor has been described, but the present invention should not limited to the contact type image sensor.

As will be recognized in the previous statement, a light receiving insulating substrate and a driving insulating substrate are overlaid with each other, and hence, the resultant sensor can be thinner than the conventional embodiment.

The light receiving insulating substrate and the driving insulating substrate can be dissembled; if one of the substrates is defective, only the defective substrate is replaced with new one, and the unit can be assembled again. Thus, the cost for the useless material can be can be curtailed at the minimum expense.

Although molded resin is necessary for positioning an elastic connector and adjusting a pressing force when the substrates are connected by the elastic connector, a housing is employed for the same purpose in this invention; therefore, advantageously the expense for required material can be curtailed.

Additionally, a positioning means serves to easily position the light receiving insulating substrate to the driving insulating substrate, and consequently, an efficiency in assembling the unit is enhanced.

Moreover, since a scattered light type light emitting element is employed and a wall of a housing for holding the light emitting element is slanted to make a light reflecting and guiding face, the scattered light from the light emitting element can be effectively utilized, and a deviation of the quantity of light can be improved at the same time. Further, since the housing is used to guide light, the cost of the required material can be curtailed.

Furthermore, affixing white seal to an inner wall of the housing causes an illuminance of a face of an original to be improved, and a deviation of the quantity of light is reduced. Eventually, the minimum number of LED chips are required to obtaining the required illuminance of the face of the original.

What is claimed is:

1. An image sensor comprising:
   a light receiving insulating substrate which has a plurality of light receiving elements with one row disposed on one major surface and has a first wiring portion on one side of the major surface for connecting the light receiving elements to a plurality of external driving elements;
   a driving insulating substrate which has the driving elements mounted on one major surface and has a second wiring portion on one side of the major surface for connecting the driving elements to the light receiving elements;
   a press-contact connector for electrically connecting the wiring portions, keeping the light receiving insulating substrate and the driving insulating substrate in contact with each other with their respective wiring portions positioned back to back; and
   engaging means provided close to at least one of the wiring portions in the light receiving insulating substrate and the driving insulating substrate and also provided in the press-contact connector, for enhancing a mechanical holding strength of the press-contact connector to the insulating substrates.

2. An image sensor according to claim 1, wherein said press-contact connector has guide means for guiding the connector when it is attached to said light receiving insulating substrate and said driving insulting substrate; the guide means is composed of a notch formed in at least one of said light receiving insulating substrate and driving insulating substrate and a guide piece formed in said press-contact connector to fit in the notch.

3. An image sensor according to claim 1, wherein said engaging means is composed of two or more apertures formed in at least one of said light receiving insulating substrate and said driving insulating substrate and engaging pins formed in said press-contact connector to fit in the apertures in the condition that they can either be engaged or released.

4. An image sensor comprising:
   a light receiving insulating substrate which has a plurality of light receiving elements with one row disposed on one major surface and has a first wiring portion on one side of the major surface for connecting the light receiving elements to a plurality of external driving elements;
   a driving insulating substrate has the driving elements mounted on one major surface and has a second wiring portion on one side of the other major surface for connecting the driving elements to the light receiving elements;
   an L-shaped elastic connector for electrically connecting the first and second wiring portions under the circumstance that the light receiving insulating substrate and the driving insulating substrate are overlaid with each other with the first and second wiring portions positioned close to each other in the identical direction; and pressing means for pressing the L-shaped elastic connector to the light receiving insulating substrate and the driving insulating substrate.

5. An image sensor according to claim 4, wherein said L-shaped connector has a conductive layer of electrically conductive rubber and an insulating layer of insulating rubber alternately disposed in contact with each other.

6. An image sensor according to claim 4, further comprising positioning means for positioning said light receiving insulating substrate on said driving insulating substrate.

7. An image sensor according to claim 4, wherein said positioning means is composed of a cut formed on said driving insulating substrate along the direction of an arrangement of said driving elements and a positioning guide provided in a holder fixing said light receiving insulating substrate to said driving insulating substrate to fit in the cut.

* * * * *